United States Patent

Ishizaka

[15] 3,675,550
[45] July 11, 1972

[54] DEVICE FOR CORRECTING THE OPEN APERTURE RATIO OF INTERCHANGEABLE LENSES IN A CAMERA SELF-CONTAINING A TTL EXPOSURE METER

[72] Inventor: Sunao Ishizaka, Tokyo, Japan

[73] Assignee: Nippon Kogaku K.K., Tokyo, Japan

[22] Filed: April 9, 1970

[21] Appl. No.: 26,986

[30] Foreign Application Priority Data

April 18, 1969 Japan.................................44/29642
April 18, 1969 Japan.................................44/29641

[52] U.S. Cl.........................95/10 C, 95/42, 95/64 R
[51] Int. Cl.........................G03b 17/14, G03b 9/07
[58] Field of Search...............................95/10, 42, 64 R

[56] References Cited

UNITED STATES PATENTS

| | | | |
|---|---|---|---|
| 3,082,672 | 3/1963 | Swarofsky | 95/10 |
| 3,352,220 | 11/1967 | Lang et al. | 95/10 |
| 3,532,036 | 10/1970 | Nakamura | 95/42 X |
| 3,545,351 | 12/1970 | Hahn | 95/10 C |
| 3,552,289 | 1/1971 | Fujimoto | 95/42 X |
| 3,495,514 | 2/1970 | Nakamura | 95/10 C |
| 3,461,783 | 8/1969 | Fujii | 95/10 C |
| 3,439,600 | 4/1969 | Suzuki | 95/64 R X |

*Primary Examiner*—Samuel S. Matthews
*Assistant Examiner*—Michael Harris
*Attorney*—Marn & Jangarathis

[57] ABSTRACT

The lens must be mounted in a position corresponding to the largest aperture of the lens. An exposure control member, which is associated with the meter, is rotatably mounted on the camera body. The member is connected to the f-stop adjusting ring. The lens barrel has an abutment which, at its extended position, prevents incorrect mounting of the lens. The interconnection between the f-stop ring and the exposure control member is spaced from the abutment by a distance relative to the maximum aperture of the lens.

9 Claims, 16 Drawing Figures

DEVICE FOR CORRECTING THE OPEN APERTURE RATIO OF INTERCHANGEABLE LENSES IN A CAMERA SELF-CONTAINING A TTL EXPOSURE METER

BACKGROUND OF THE INVENTION

This invention relates to a device for correcting the open aperture ratio in a single lens reflex camera for effecting TTL photometry (i.e. a method of measuring the light transmitted through a photographing lens).

DESCRIPTION OF THE PRIOR ART

With the known device of this type such as the one in which a lens is mounted to the camera body and subsequently rotated to an open stop position to correct the open aperture ratio of the lens, the user of the camera tends to neglect rotating the lens to the open stop position after the lens has been mounted to the camera body, and this had led to the possibility of causing an erroneous measurement of exposure.

SUMMARY OF THE INVENTION

The present invention intends to overcome such a disadvantage existing in the prior art device of the described type.

According to the present invention, interchangeable lenses are made ready to mount to a camera body by setting a lens stop ring to the open stop value. At the same time it is possible to determine the amount of a signal for correcting the difference in open aperture ratio between the lenses, whereby when the lenses in such a state are mounted to the camera body this mounting operation causes the correction signal to be transmitted to an exposure regulating mechanism in the camera body to thereby correct the difference in open aperture ratio between the lenses.

According to the present invention, there is provided a device for correcting the open aperture ratio of interchangeable lenses in a camera containing a TTL exposure meter. The device comprises at least a lens tube and a lens stop ring provided in the interchangeable lens mounting portion of the camera. A correction amount controlling and locking means is provided in said lens stop ring so that its set position lies in a specific stop position of the stop scale on said stop ring opposite a marker provided on said lens tube so as to ensure that each lens is mounted at a predetermined position with respect to the camera body. The correction amount controlling and locking means prevents the lenses from being mounted to the camera body in any other stop setting position than the position representing the open stop value. Also, the lenses are released from the prevention and engaging said lens tube when said stop ring is set to the open stop value. An exposure correction ring is operatively associated with an exposure calculating mechanism in the camera body, and an interlocking member is provided for said exposure correction ring and said lens tube. Both the exposure correction ring and the interlocking member are disposed toward the camera body. The interlocking member moves the exposure correction ring in response to the operation of mounting the inter-changeable lenses to the camera body so as to release the engagement between the stop ring and the lens tube in a position where the open aperture ratio has been corrected. The lens stop ring and the exposure correction ring are operable together with each other.

According to the present invention, there is also provided a device of the described type, which further comprises an auxiliary ring and an exposure correction ring both provided toward the camera body. The auxiliary ring is adapted to determine the stop position of said exposure correction ring in correlationship with the amount of correction of the open aperture ratio. The exposure correction ring is operatively associated with an exposure calculating mechanism in the camera body, and a locking means is provided between the auxiliary ring and the exposure correction ring to lock these rings together. The correction amount controlling and locking means moving said auxiliary ring in response to the operation of mounting interchangeable lenses to the camera body so as to release the engagement between the stop ring and the lens tube in a position where the open aperture ratio has been corrected. The auxiliary ring locks the exposure correction ring in its position for correcting the open aperture ratio by means of the locking means. The lens stop ring and the exposure correction ring are operable together with each other.

BRIEF DESCRIPTION OF THE DRAWINGS

The invention will be described more fully with respect to the illustrative embodiments thereof shown in the accompanying drawings, in which.

DESCRIPTION OF THE PREFERRED EMBODIMENTS

Figure 1:
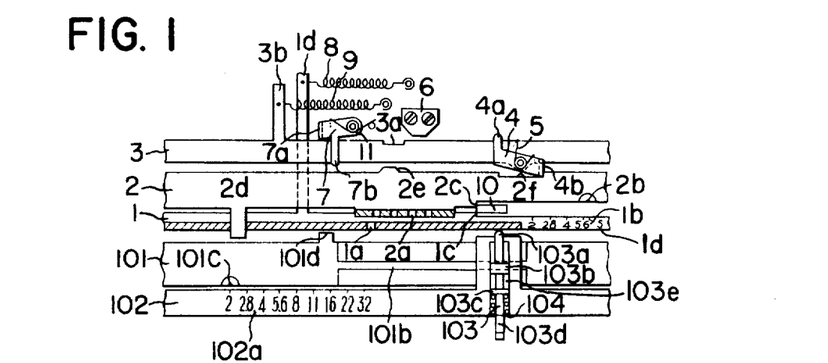
FIG. 1 is a developed view of an embodiment of the present invention, showing the position in which lenses are pressed against the camera body.
Figure 4:
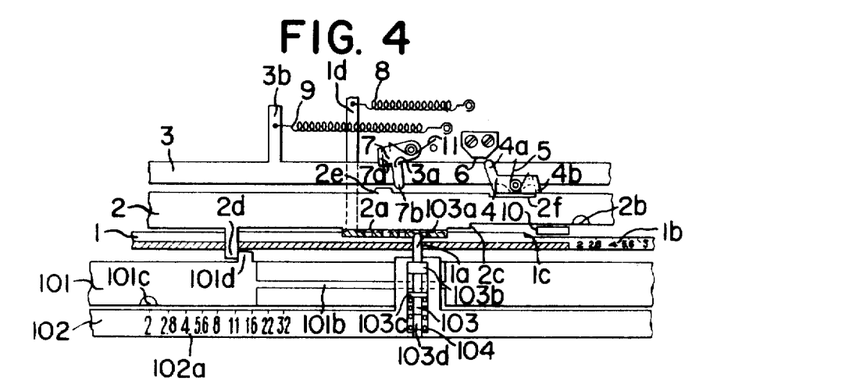
FIG. 4 is a developed view similar to FIG. 1, but showing the position in which the lenses are completely mounted to the camera body.
Figure 5:
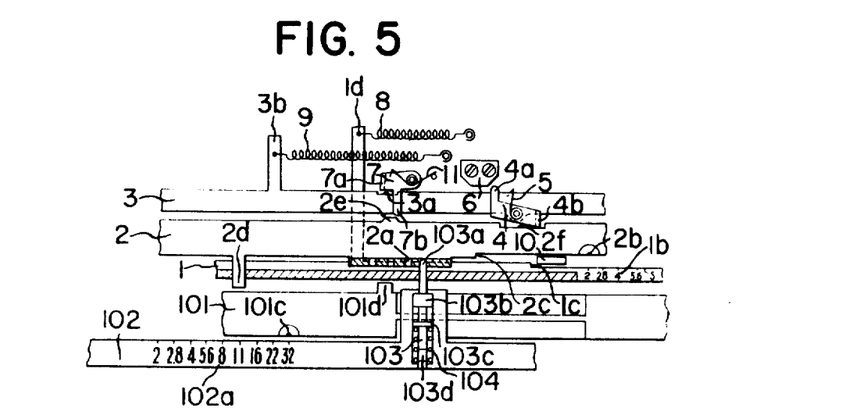
FIG. 5 is a developed view similar to FIG. 1, but showing the position just before the lenses are removed from the camera body.
Figure 6:
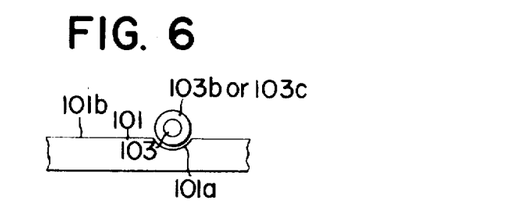
FIG. 6 is an enlarged plan view showing a portion of the lens tube.

Referring now to FIGS. 1 to 6 showing an embodiment of the present invention, these figures except FIG. 6 illustrate, in linearly developed view for the sake of convenience, a portion of a camera to which the present invention relates, namely the annular portion including lenses whose open aperture ratio is F2, for example, and a lens mounting portion. Exchangeable lenses may be mounted to the camera body by the well-known bayonet system with the lenses rotated counter-clockwise (or moved from right to left as viewed in the drawings). In FIG. 1, a stop auxiliary ring 1 is rotatably mounted on a camera body (not shown). The stop auxiliary ring 1 is normally urged for rotation toward a rest position representing the open stop value by a spring 8 having one end thereof secured to the projected member 1d of the stop auxiliary ring and the other end secured to the camera body. The stop auxiliary ring 1 is provided with an open scale 1b and a hole 1a which is to be engaged by an interconnecting pin 103 supported for axial movement in a lens stop adjusting ring 102 and normally urged toward the camera body by a spring 104. The interconnecting pin 103 includes a head 103a, flange portions 103b and 103c and a marker 103d, and it is arranged so that its set position lies in a specific stop position of the stop scale 102a on the lens stop adjusting ring opposed to a marker 101c provided on the lens tube such that the interconnecting pin 103 is spaced from a projection 101d provided on the lens tube 101 by a distance according to the maximum aperture ratio of the lens when the stop adjusting ring 102 is set to the maximum aperture position of the lens. When no lens is mounted to the camera body, the stop auxiliary ring 1 is stopped from moving by the engagement between a restricting means 10 secured to the camera body and a recess 1c formed in the stop auxiliary ring 1. The stop indicator ring 1 is directly connected to an unshown stop indicating mechanism for checking up the stop value through a finder. The interconnecting pin 103 having the head 103a, flange portions 103b and 103c and marker 103d, together with the spring 104. Adjacent to the stop auxiliary ring 1 there is disposed an exposure control ring 2 having at least one or more apertures 2a formed at a predetermined location thereof corresponding to the maximum aperture ratio of the lens so as to receive the interconnecting pin 103. The exposure control ring 2 further includes an engaging member 2c for engaging the restricting means 10, a projection 2d forming an interlocking member for engaging a projection 101d which constitutes an interlocking means provided in the lens tube 101 at a particular point thereof common to various lenses to be mounted, and a recess 2f. The exposure control ring 2 also includes a projection 2e for engaging a projection 7b formed in an key 7 which is rotatably mounted on the camera body at a predetermined location thereof directed to the removal of lenses. The key 7 has a key portion 7a and is normally urged in the counter-clockwise direction by a spring 11. The exposure control ring 2 has a marker 2b formed in opposed relationship with the open scale 1b on the stop auxiliary ring 1, and is directly connected to a known exposure calculating mechanism such as resistor or the like. In opposed relationship with the exposure control ring 2 there is provided a biasing ring 3 rotatably mounted on the camera body and normally urged toward pen stop value by a spring 9 having one end thereof secured to the camera body and the other end secured to a projection 3b formed in the biasing ring 3. The biasing ring 3 is provided with a interlocking member 4 journalled thereto and having an engaging portion 4b adapted to engage the recess 2f in the exposure control ring 2 before lenses are mounted, and a projection 4a adapted to engage a cam 6 secured to the camera body in a predetermined position during the lens mounting operation, in which position the engaging member 4b is disengaged from the recess 2f. The biasing ring 3 is also provided with a recess 3a for receiving the key portion 7a of the key 7 when or just before lens has been mounted. The lens tube 101 has a marker 101c opposed to the stop scale 102a on the stop adjusting ring 102 so as to always ensure each lens, when mounted, to stop at a specific position with respect to the camera body. The lens tube also has a concave portion 101a (FIG. 6) which, when lens is mounted, allows the interconnecting pin 103 to retract inwardly a predetermined amount only when the stop adjusting ring 102 is set to the maximum aperture position of the lens so as to establish the connection to the camera body, and which further interferes with the flange portion 103b of the retracted interconnecting pin 103 to fix the stop adjusting ring 102 into the maximum aperture position.

Figure 2:
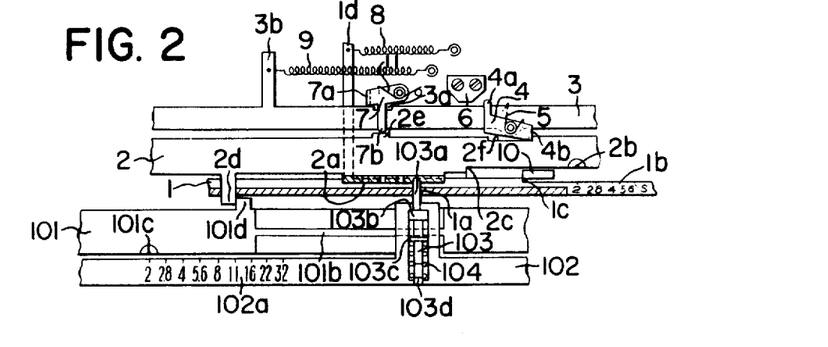
FIG. 2 is a developed view similar to FIG. 1, but showing the position in which the open aperture ratio of the lenses have been corrected.
Figure 3:
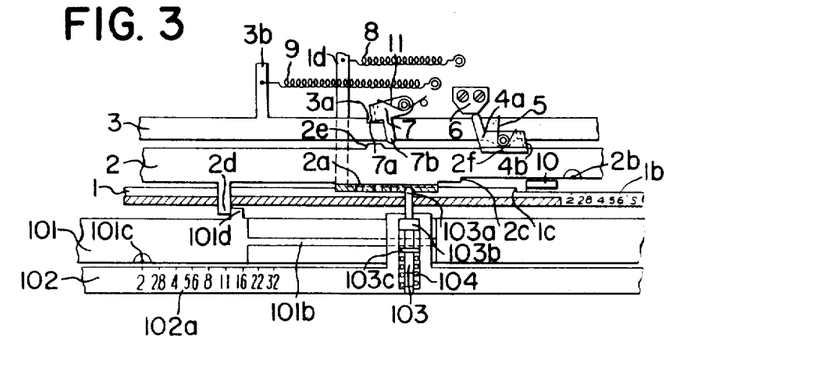
FIG. 3 is a developed view similar to FIG. 1, but showing the position just before the lenses are completely mounted to the camera body.

Description will now be made of the operation of the above-described embodiment of the present invention. In FIG. 1, the device is shown in the position where lenses to be mounted we pressed against the surface of the camera body with the lens stop adjusting ring 102 set to the maximum aperture ratio F2. As discussed above, the stop adjusting ring 102 is fixed in the maximum aperture position by the cooperation between the flange 103b of the interconnecting pin 103 and the concave portion 101a formed in the flange 101b of the lens tube 101, as shown in FIG. 6. The auxiliary ring 1 and exposure correction ring 2 are stopped because the recess 1c and engaging portion 2c of the respective rings are engaged with the restricting means 10 by the springs 8 and 9 respectively, although the latter spring acts via the auxiliary ring 3 and interlocking member 4. The open scale 1b on the lens stop adjusting ring 1 is then in accord with the marker 2b on the exposure correction ring 2 at a position indicated by a symbol "S." If the lens is rotated from this position (moved from right to left as viewed in FIG. 1), each lens is initially rotated an equal amount thereby causing the projection 101d of the lens tube 101 to engage the projection 2d of the exposure control ring 2, which in turn is rotated, and also causing the recess 2f in the exposure control ring 2 to be engaged by the engaging portion 4b of the interlocking member 4, which in turn rotates the ring 3 against the force of the spring 9. Continued rotation of the lens causes the lens now mounted to the camera body to be set to a specific stop position of the stop scale opposed to the marker provided on the lens tube so that each lens is always ensured to stop at a predetermined position with respect to the camera body, as shown in FIG. 2. Thus, the interconnecting pin 103 engages the hole 1a in the auxiliary ring 1. Thus there is provided relative displacement between the exposure control ring 2 and the auxiliary member. However, the rotation of the exposure control ring 2 which has already taken place by that time causes a predetermined one of the apertures 2a corresponding to the maximum aperture ratio of each interchangeable lens to be brought into alignment with the aperture 1a in the indicator ring 1, whereupon the interconnecting pin 103 engages these aligned apertures 1a and 2a to complete the correction of the maximum aperture ratio. Of course, the relative displacement is variable with the maximum aperture ratio of the lens in use. Thereupon, the flange 101b of the lens tube 101 is positioned between the flange portions 103b and 103c of the interconnecting pin 103, thus releasing the fixture of the stop ring 102 at the maximum aperture position. If the lens is further rotated, the auxiliary ring 1, exposure correction ring 2 and biasing ring 3 are rotated together due to the engagement between the interconnecting pin 103 and the aligned apertures 1a and 2a and the engagement between the recess 2f and the interlocking member 4, and thereafter, as shown in FIG. 3, the projection 4a of the interlocking member 4 engages the cam 6 and the interlocking member 4 is disengaged from the recess 2f of the exposure correction ring 2, whereas the recess 3a in the biasing ring 3 is engaged by the key portion 7a of the key 7. Thus, as shown in FIG. 4, the lens tube 101 strikes a known restricting member (not shown) provided on the side of the camera body and thereby completes the mounting of the lenses.

Removal of the lenses may be accomplished by rotating them in the opposite direction to that for the lens mounting. FIG. 5 shows the position of the device just before the removal of lenses (whose stop value is set to F32). As shown, at a predetermined position during the course of lens removing operation, the engaging portion 4b of the interlocking member 4 is received into the recess 2f in the exposure control ring 2 and at the same time the projection 2e of the ring 2 engages the projection 7b of the key 7, while the recess 3a in the biasing ring 3 is disengaged from the key portion 7a of the key 7. If the lens is removed in this position, the interconnecting pin 103 is disengaged from the hole 1a of the auxiliary ring 1 and the aperture 2a of the exposure correction ring 2, whereby the biasing ring 3 together with the exposure control ring 2 is rotated toward the maximum aperture position by the force of the spring 9 and returns to the position as shown in FIG. 1.

Any operational trouble which might result from the failure of the interconnecting pin 103 to engage both apertures 1a and 2a at a time could be obviated if the deviation between these apertures is in such relationship that the aperture 2a is angularly ahead with respect to the hole 1a and the amount of such deviation is within a range allowable for the accuracy of measurement, and if the relationship between the flange portion 103b of the interconnecting pin 103 blocking the rotation of the stop adjusting ring 102 during the lens mounting process and the concave portion 101a in the lens tube 101 is such that the stop adjusting ring 102 can rotate toward the minimum stop value within a range allowable for the accuracy of measurement. Also, as shown in FIG. 1, the marker 103d on the interconnecting pin 103 can be fully seen when the interconnecting pin 103 is in its extended position, and it can still be fully seen when the pin 103 is in engagement with the auxiliary ring 1 alone, so that the state of engagement of the interconnecting pin 103 can be well observed from outside.

Another embodiment of the present invention will now be described. Referring to FIGS. 7 to 16, the annular portion of a camera including lenses whose open aperture ratio is F2, for example, and a lens mounting portion is shown in linearly developed view for the sake of convenience. Exchangeable lenses may be mounted to the camera body by the well-known bayonet system with the lenses rotated counter-clockwise (moved from right to left as viewed in the drawings).

Figure 7:
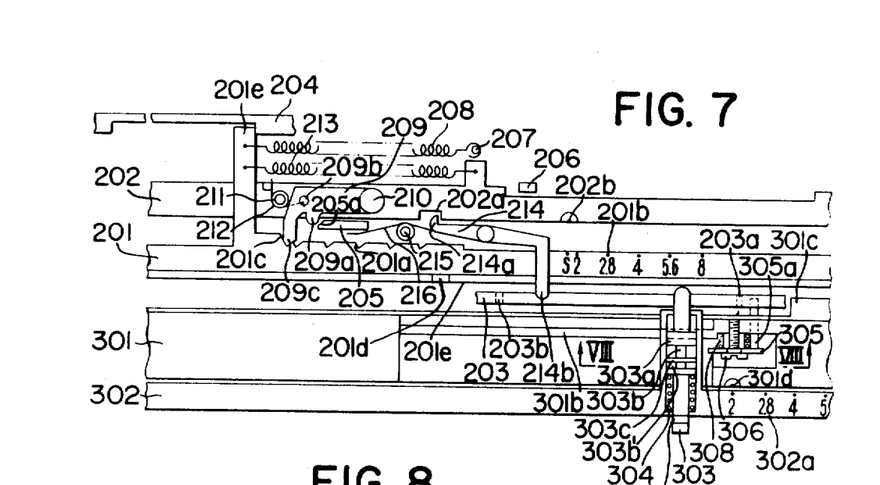
FIG. 7 is a developed view of another embodiment of the present invention, showing the position in which lenses are pressed against the camera body for mounting.
Figure 8:
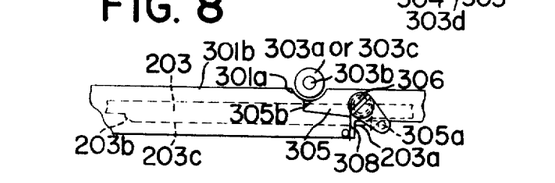
FIG. 8 is a sectional view taken along line VIII—VIII of FIG. 7.
Figure 9:
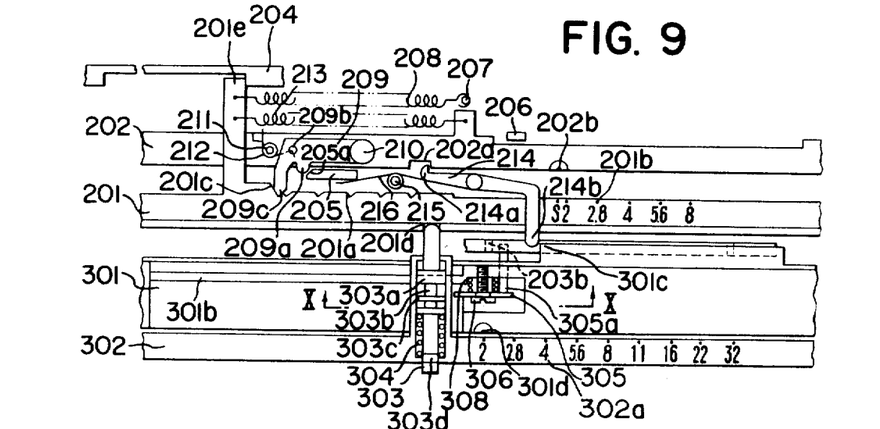
FIG. 9 is a developed view of the FIG. 7 embodiment, but showing the manner in which the lenses are mounted to the camera body with the correction amount controlling and locking means engaged with the auxiliary ring.
Figure 10:
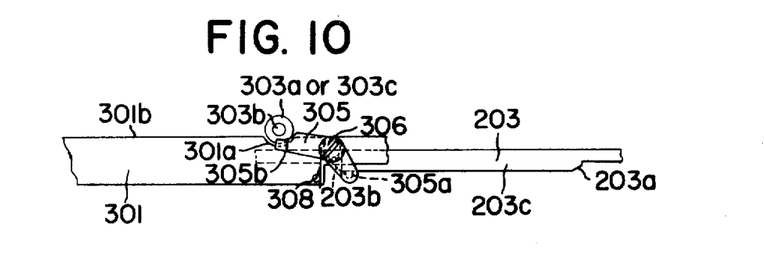
FIG. 10 is a sectional view taken along line X—X of FIG. 9.
Figure 11:
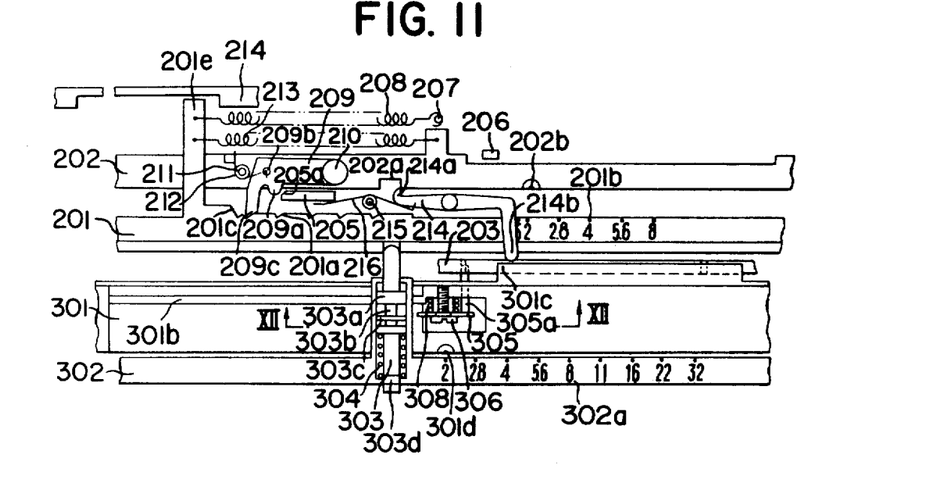
FIG. 11 is a developed view similar to FIG. 9 but showing the position in which the correction of the open aperture ratio of the lenses have been completed.
Figure 12:
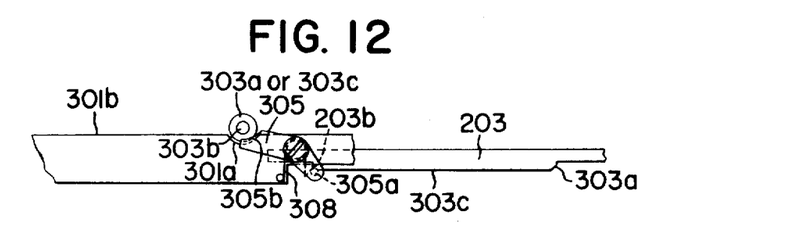
FIG. 12 is a sectional view taken along line XII—XII of FIG. 11.

In FIG. 7, an auxiliary ring 201 is rotatably mounted on a camera body (not shown). The auxiliary ring 201 is normally urged for rotation toward a rest position representing the maximum aperture position by a spring 208 having one end thereof secured to the projected member 201e of the auxiliary ring 201 and the other end secured to a shaft 207 fixed to the camera body. With no interchangeable lens mounted, the projected member 201e of the auxiliary ring 201 is engaged with a restricting means 204 secured to the camera body so that the auxiliary ring 201 remains immovable. The auxiliary ring 201 is formed with a plurality of notches 201a, an open scale 201b and a hole 201d, and directly connected to a stop indicating mechanism (not shown) for checking up the stop value through a finder. Adjacent to the auxiliary ring 201 there is disposed an exposure control ring 202 which is normally urged for rotation toward the minimum stop value by a spring 213 mounted to the auxiliary ring 201. The exposure control ring 202 is formed with a marker 202b for the open scale 201b and a recess 202a, and directly connected to a known exposure calculating mechanism such as resistor or the like. A pawl 209 providing a locking means is journalled to the exposure control ring 202 by means of a shaft 210, and includes an engaging portion 209c engaging one of the notches 201a, and a tail portion 209a engaging the sloped surface 205a of a smaller cam 205 secured to the camera body when or after the lens is removed. The pawl 209 is normally urged in the counter-clockwise direction by a spring 212. A restricting means 206 is provided to restrict the movement of the exposure correction ring 202. A locking member 214 is rotatably journalled to the camera body and it has a key portion 214a at one end thereof and a tail portion 214b at the other end. The locking member 214 is normally urged clockwise by a spring 216. The locking member 214 is constructed such that the tail portion 214b thereof engages a projected portion 301c secured to a lens tube 301 just before the lens is completely mounted, and that the key portion 214a remains engaged with the recess 202a in the correction ring 202 during the lens mounting operation till its completion. A larger cam 203 having sloped surfaces 203a and 203b and a convex surface 203c is secured to the camera body. An interconnecting pin 303 is supported for axial movement in a lens stop adjusting ring 302 so that its set position lies in a specific stop adjusting position of the stop scale 302a on the stop ring 302 opposed to a marker 301d provided on the lens tube 301 such that interconnecting pin 103 is spaced from a projected portion 301c by a distance according to the maximum aperture ratio of the lens when the stop adjusting ring 302 is set to the maximum aperture position of the lens. The interconnecting pin 303 is normally urged toward the camera body by a spring 304, and it is arranged so that except for the open stop value it cannot be retracted due to the interference between the flange 301b of the lens tube 301 and the flange portion 303a of the interconnecting pin 303 but that for the open stop value it can be retracted due to a concave portion 301a provided in the flange 301b and having a greater diameter than the flange 303a of the interconnecting pin 303 (see FIG. 8). In the retracted position of the interlocking pin 303, there occurs interference between the concave portion 301a and the flange portion 303a to prevent the rotation of the stop adjusting ring 302. The interconnecting pin 303 has a marker 303d provided thereon for indicating the state of engagement between the pin 303 and the auxiliary ring 201. A restraining lever 305 is rotatably journalled to the lens tube 301 and normally urged in the counter-clockwise direction by a spring 308 as shown in FIG. 8. The latching lever 305 has a pin 305a studded at one end thereof and a bent portion 305b formed at the other end, and is arranged so that the pin 305a engages the convex surface 203c of the larger cam 203 for a predetermined angle or more of rotation of the lens being mounted, thereby rotating the lever 305 in the clockwise direction until the lever interferes with the cam flange portion 303c as shown in FIG. 10, and that at a predetermined position when or just before the lens mounting is completed (FIG. 13 and 14) the pin 305a is engaged or disengaged with the sloped surface 203b to return the lever 305 to its original position.

Description will now be made of the operation of the above-described alternative embodiment. FIGS. 7 and 8 show the device according to this embodiment in the position where the stop ring is set to the open stop adjusting value F2 with the lenses to be mounted being pressed against the camera body. As shown, the auxiliary ring 201 is stopped at a position where the projection 201e is engaged with the restraining means 204 by the force of the spring 208, and the exposure control ring 202 is stopped at a position where the engaging portion 209c of the pawl 209 is engaged with the leftmost one of the notches 201a formed in the auxiliary ring 201. The marker 202b is then in accord with the symbol "S" of the open scale 201b provided on the auxiliary ring 201. The interconnecting pin 303 is retracted inwardly a predetermined amount against the force of the spring 304, so that the stop adjusting ring 302 is fixed in the shown position (maximum aperture) by the engagement between the flange portion 303a and the concave portion 301a formed in the flange 301b of the lens tube 301. If the lens is rotated from this position (to the left as viewed in the drawings), the pin 305a of the latching lever 305 passes the sloped surface 203c of the larger cam 203 to engage the convex surface 203c of the same cam, thereby rotating the latching lever 305 in the clockwise direction. Thus, as shown in FIG. 10, the bent portion 305b of the latching lever 305 is received between the flanges 303a and 303c of the interconnecting pin 303. Further rotation of the lenses causes the interconnecting pin 303 to engage the hole 201d in the auxiliary ring 201 (FIGS. 9 and 10), whereas the bent portion 305b of the latching lever 305 prevents the interconnecting pin 303 from fully engaging the interlocking 201d and thereby the stop adjusting ring 302 is not allowed to move by the cooperation between the flange portion 303a and the concave portion 301a of the flange 301b. Still further rotation of the lenses causes the lens tube 301, stop adjusting ring 302 and auxiliary ring 201 to rotate together, whereas engagement occurs between the key portion 214a of the locking member 214 and the recess 201a of the exposure control ring 202 to thereby stop the exposure control ring 202 at this position. Thus there is provided relative displacement between the auxiliary ring 201 and the exposure control ring 202 so as to allow the pawl 209 to move from the leftmost notch 201a to the subsequent notch 201a in the auxiliary ring 201. Upon completion of this movement, the projection 301c of the lens tube 301 engages the tail portion 214b of the locking member 214 while the key portion 214a of the locking member 214 is released from the engagement with the recess 202a in the exposure control ring 202 (FIGS. 11 and 12), thus allowing the auxiliary ring 20 and exposure control ring 202 to be moved together thereafter by the spring 213. Thus, the correction of the maximum aperture ratio of the is completed. Of course, the amount of relative displacement between the auxiliary ring 201 and exposure control ring 202 is variable with the maximum aperture ratio of the exchangeable lens in use.

Figure 13:
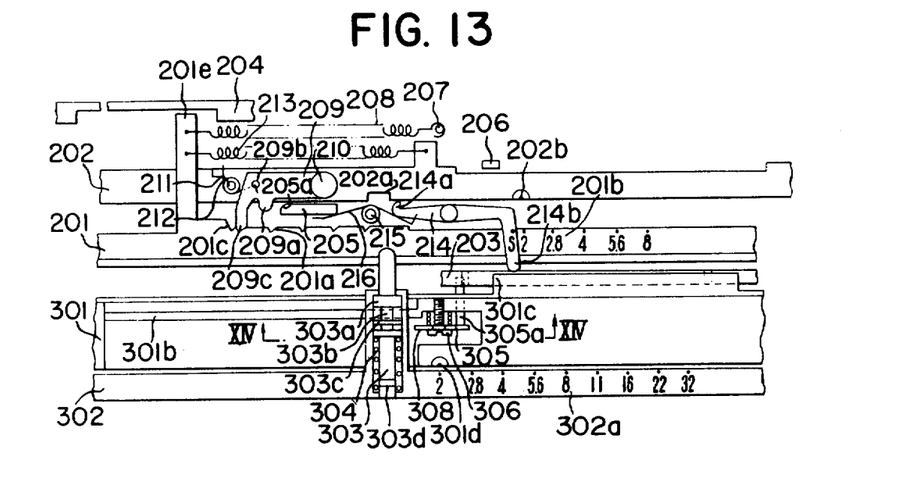
FIG. 13 is a developed view similar to FIG. 9, but showing the position in which the lenses have been completely mounted to the camera body.
Figure 14:
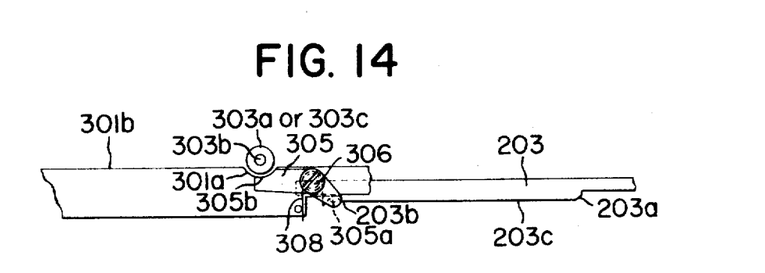
FIG. 14 is a sectional view taken along line XIV—XIV of FIG. 13.
Figure 15:
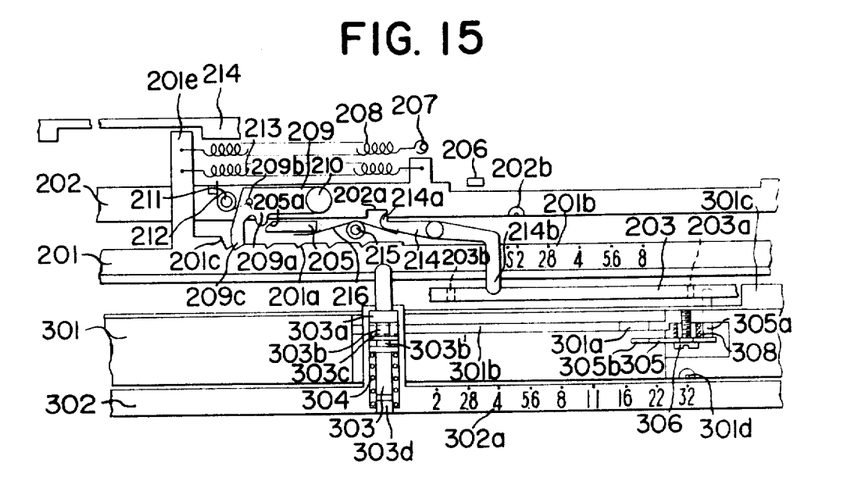
FIG. 15 is a developed view of the FIG. 7 embodiment showing the manner in which the lenses are removed from the camera body.
Figure 16:
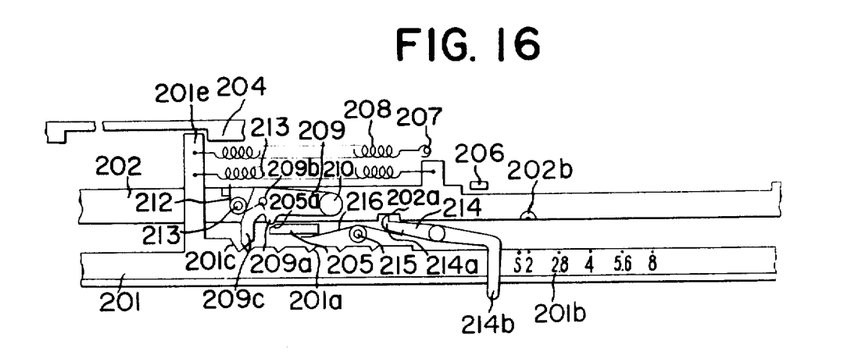
FIG. 16 is a developed view similar to FIG. 15, but showing the position just after the lenses have been completely removed from the camera body.

FIG. 13 and 14 shows the position in which the lens tube 301 engages a known member for limiting the lens mounting (not shown) provided in the camera body to thereby complete the lens mounting. If the lens is further rotated from the position shown in FIGS. 11 and 12, the pin 305a of the latching lever 305 is engaged with the sloped surface 203b of the larger cam 203 and soon disengaged therefrom to cause the latching lever 305 to be rotated counter-clockwise by the spring 309. This releases the interference between the bent portion 305b of the latching lever 305 and the flange portion 303c of the interconnecting pin 303, thus allowing the interconnecting pin 303 to be fully retracted as shown in FIG. 13. This in turn releases the interference between the flange portion 303a of the interconnecting pin 303 and the concave portion 301a of the lens tube 301, thereby allowing the stop adjusting ring 302 to be operated. Removal of the lens may be accomplished by rotating them in the opposite direction to that for the lens mounting in the known manner. FIG. 15 shows the position just before the removal of the lens from the camera body (the stop value of the lens being shown as F32). Even if the pin 305a of the latching lever 305 should engage the convex surface 203c of the larger cam 203 during the rotation of lens for their removal, the stop adjusting ring 302 can be smoothly rotated irrespective of its maximum aperture position by arranging the bent portion 305b of the lever 305 so as not to interfere with the neck portion 303b of the interconnecting pin 303. Immediately after the removal of the lens, the auxiliary ring 201 and exposure control ring 20 are rotated clockwise (moved to the right as viewed in the drawings) by the spring 208 as shown in FIG. 16, thereby causing the tail portion 209a of the pawl 209 to engage the sloped surface 205a of the smaller cam 205 while causing the engaging portion 209c of the pawl 209 to be disengaged from the notch 201a. Thus, the exposure control ring 202 is rotated in the counter-clockwise direction by the spring 213 to cause the engaging portion 209c to pass the left end face 201c of the notch 201a and engage the leftmost notch 201a to restore the original position as shown in FIG. 7.

The larger cam 203 and the flange portion 301b of the lens tube 301 may be simply arranged by using the known bayonet pawls on the camera body and lens mounting portion respectively.

What is claimed is:

1. In a single lens reflex camera having an interchangeable lens and a built-in exposure meter with a photo-sensitive element responsive to the light through the maximum aperture of the lens, the improvement comprising:
    a. means for mounting said lens to the camera body;
    b. a lens barrel provided in the interchangeable lens and having an abutment at the common position thereof;
    c. a lens stop adjusting ring provided in said lens;
    d. an exposure control member operatively associated with said exposure meter, rotatably mounted on the camera body and biased to a rest position;
    e. means for interconnecting said stop adjusting ring with said exposure control member; said interconnecting means being provided on said stop ring, spaced from said abutment by a distance according to the maximum aperture ratio of said lens when said stop ring is set to the maximum aperture position of said lens, movable to an extended position for preventing the mounting of said lens to said camera body and to a retracted position for allowing said mounting and biased toward its extended position;
    f. means for preventing the movement of said interconnecting means from its extended position to its retracted position except when the said stop ring is set to the maximum aperture position of said lens and for allowing said movement and connecting said lens barrel with said stop ring in co-operation with said interconnecting means only when said stop adjusting rings is set to the maximum aperture position of said lens;
    g. an auxiliary member rotatably independently of the control member mounted on the camera body, biased to a rest position and provided with a surface on which said interconnecting means slides during mounting movement of said lens, said surface being formed with a hole engageable with said interconnecting means during the mounting of said lens, said exposure control member being formed with a second abutment engageable with said abutment during the mounting of said lens to cause the relative displacement between said exposure control member and said auxiliary member according to the maximum aperture ratio of said lens until said interconnecting means is engaged with said hole in said surface; and
    h. means for connecting said exposure control member with said stop adjusting ring in cooperation with said interconnecting means through said hole when said relative displacement is completed.

2. The apparatus as defined in claim 1 wherein said preventing means comprises a flange having a concave portion for allowing the movement of said interconnecting means from its extended position to its retracted position when said aperture adjusting ring is set to the maximum aperture position of said lens, and wherein said interconnecting means comprises an interconnecting pin having a flange portion engageable with said concave portion to connect said aperture adjusting ring with said lens barrel in its retracted position and a neck portion slidable on said flange of said preventing means in its extended position.

3. The apparatus as defined in claim 1, wherein said connecting means is a row of apertures provided on said exposure control member, each aperture thereof being arranged to be aligned with said hole in said auxiliary member for connecting said exposure control member with said stop adjusting ring in cooperation with said interconnecting means through said hole when said relative displacement between said exposure control member and said auxiliary member is completed.

4. The apparatus as defined in claim 1 and further comprising means for biasing said exposure control member toward its rest position.

5. The apparatus as defined in claim 4 wherein said biasing means comprises a first member being biased toward its rest position, a second member for interlocking said exposure control member with said first member to bias said control member toward its rest position, and a cam member provided on said camera body to engage with said second member when the mounting of said lens to said camera is completed thereby to set free said exposure control member from the biasing of said first member.

6. In a single lens reflex camera having an interchangeable lens and a built-in exposure meter with a photo-sensitive element responsive to the light through the maximum aperture of the lens, the improvement comprising:
    a. means for mounting said lens to the camera body;
    b. a lens barrel provided in said interchangeable lens and having an abutment at the common position thereof;
    c. a lens stop adjusting ring provided in said lens;
    d. an exposure control member operatively associated with said exposure meter rotatably mounted on said camera body and biased to a rest position;
    e. an auxiliary member independently rotatable of said control member, said auxiliary member being mounted on said camera body and biased to a rest position;
    f. means for interconnecting said lens stop adjusting ring with said auxiliary member, said interconnecting means being provided on said stop adjusting ring, spaced from said abutment by a distance according to the maximum aperture ratio of said lens when the said ring is set to the maximum aperture position of said lens, movable to an extended position for preventing the mounting of said lens to said camera body and to a retracted position for allowing said mounting and biased toward its extended position;
    g. means for preventing the movement of said interconnecting means from its extended position to its retracted position except when said stop ring is set to the maximum aperture position of said lens and for allowing said movement and connecting said lens barrel with said stop adjusting ring in cooperation with said interconnecting means only when said stop ring is set to the maximum aperture position of said lens;

h. means for locking said exposure control member at the rest position thereof and having an engaging portion engageable with the abutment on said lens barrel for releasing said control member from the locking position of said locking means, said auxiliary member having a surface on which said interconnecting means slides during the mounting of said lens, said surface being formed with a hole engageable with said interconnecting means during the mounting of said lens to cause relative displacement between said control member and said auxiliary member until said control member is released;

i. means for connecting said exposure control member with said auxiliary member when relative displacement is completed; and j. means for latching said interconnecting means at the retracted position thereof until mounting movement of said lens is completed.

7. The apparatus as defined in claim 6 wherein said preventing means comprises a flange having a concave portion for allowing the movement of said interconnecting means from its extended position to its retracted position when said aperture adjusting ring is set to the maximum aperture position of said lens and wherein said interconnecting means comprises an interconnecting pin having a flange portion engageable with said concave portion to connect said aperture adjusting ring with said lens barrel in its retracted position and a neck portion slidable on said flange of said preventing means in its extended position.

8. The apparatus as defined in claim 6 wherein said latching means comprises a latching member, a second member and a cam, said latching member rotatably mounted on said lens barrel and having a first member engageable with said interconnecting means to latch said interconnecting means at the retracted position, said latching means being biased in a direction in which said first member is disengaged from said interconnecting means; said second member secured to said latching member and extending toward said camera body, and said cam being provided on said camera body for controlling said latching member to engage said first member with said interconnecting means until the mounting movement of said lens to said camera body is completed.

9. The apparatus as defined in claim 6 wherein said connecting means comprises a pawl member rotatably mounted on said exposure control member and biased in the direction in which said pawl member engages said auxiliary member, and wherein a row of notches are provided on said auxiliary member, each notch thereof being arranged to be engaged by said pawl member for connecting said control member with said auxiliary member when said relative displacement between said exposure control member and said auxiliary member according to the maximum aperture ratio of said lens is completed.

* * * * *